United States Patent [19]
Hudson, III et al.

[11] 4,112,699
[45] Sep. 12, 1978

[54] HEAT TRANSFER SYSTEM USING THERMALLY-OPERATED, HEAT-CONDUCTING VALVES

[75] Inventors: George Elbert Hudson, III, Silver Spring; Arthur E. Clark, Adelphi, both of Md.

[73] Assignee: The United States of America as represented by the Secretary of the Navy, Washington, D.C.

[21] Appl. No.: 793,573

[22] Filed: May 4, 1977

[51] Int. Cl.² .................. F25B 21/02; F28F 27/00
[52] U.S. Cl. .................................... 62/3; 165/96
[58] Field of Search ............ 62/3, 514; 165/96; 310/4

[56] References Cited
U.S. PATENT DOCUMENTS

| | | |
|---|---|---|
| 3,157,801 | 11/1964 | Shequen ........................... 62/3 |
| 3,261,721 | 7/1966 | Cornish ............................ 62/3 |
| 3,841,107 | 10/1974 | Clark ............................... 165/96 |
| 4,028,905 | 6/1977 | Andres et al. ..................... 62/3 |

Primary Examiner—Lloyd L. King
Attorney, Agent, or Firm—R. S. Sciascia; A. L. Branning; W. C. Anderson

[57] ABSTRACT

A heat transfer system, e.g., refrigeration system or heater, particularly valuable at cryogenic temperatures which comprises a serial arrangement, in abutting contact and connected to the material or device to be cooled or heated, of a thermal reservoir made of a material having a specific heat capacity, a thermal valve made of a thermally-conductive material whose thermal conductivity increases as its temperature increases, e.g., magnesium, a working material whose temperature is periodically varied, e.g., by magnetic or electric fields, and another valve of a thermal-conductive material whose thermal conductivity decreases as its temperature increases, e.g., NaCl. The magnetic refrigeration or heater units may be ganged to increase the cooling or heating ability.

10 Claims, 4 Drawing Figures

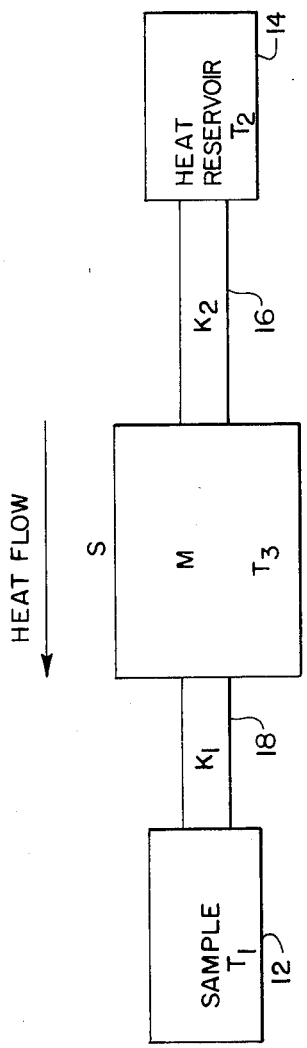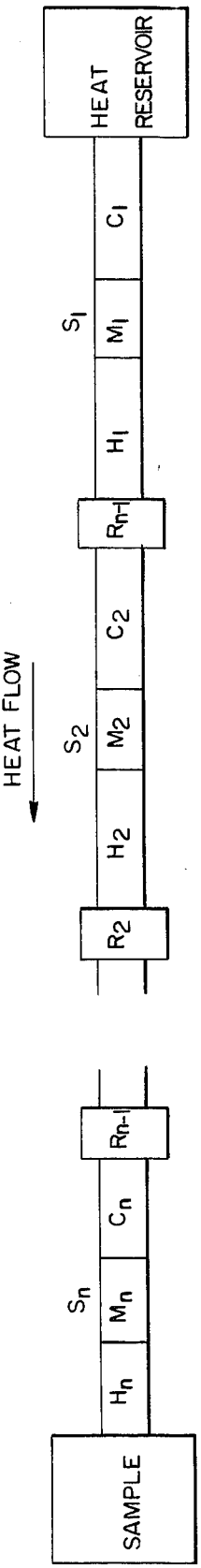

HEAT TRANSFER SYSTEM USING THERMALLY-OPERATED, HEAT-CONDUCTING VALVES

BACKGROUND OF THE INVENTION

The present invention relates generally to heat transfer systems. More particularly, the invention relates to a small highly reliable, low maintenance, light weight solid state refrigeration system particularly valuable at cryogenic temperatures. Alternatively, the system may be used as a heater.

Many infrared (IR) detectors are operative only at low temperatures. These detectors conventionally are cooled by miniature cryogenic refrigerators which are expensive and have exhibited high failure rates. Because frequent maintenance is also required, e.g., approximately every 200 to 1000 hours, a large number of the refrigeration units are out of service and others remain in questionable condition. A truly reliable and low cost cryogenic refrigerator is therefore needed. Such a refrigerator would solve these and other problems, and would also stimulate research into further development of more sensitive detectors.

IR detection is only one of several areas where cryogenic ambients are required with the components to be cooled being sufficiently small to be serviced by a miniature refrigeration system. Many superconducting devices, such as computer elements, etc., require temperatures in the range of 4K. Later cooling and the use of miniature cryo-electric elements for computer memories are areas which still remain relatively unexplored, partly because of limitations in the present methods of cryogenic refrigeration.

Certain rare earth iron garnets possess a large, negative magnetocaloric effect in the temperature range of interest, e.g. 4K to 25K. This temperature range is precisely the range where the cost of existing cryogenic refrigeration systems skyrocket. In addition, the existing 4K units generally require large compressors which increase the weight of the system from 15 pounds to over 400 pounds and input power from 0.5 kW to 5.5 kW. Thus only certain applications are possible with these low temperature units.

In U.S. Pat. No. 3,841,107, issued Oct. 15, 1974, to A. E. Clark, coinventor herein, a magnetic refrigeration system is described which utilizes the aforementioned unique characteristic of the rare earth iron garnet in conjunction with conventional paramagnetic material. A heat source and a heat sink are thermally connected by a serial arrangement of magnetocaloric elements having a large negative magnetocaloric effect in abutting relationship with a paramagnetic material. Elements of a suitable superconducting material functioning as thermal valves, are interdisposed between the heat source, the heat sink and the aforesaid serial arrangement. Movement of a magnetic field from the magnetocaloric element to the paramagnetic element effects the refrigeration cycle.

The improved, cryogenic, heat transfer system described herein is a simple, light weight cryogenic refrigeration or heater particularly applicable for temperatures below 20K. The cost and weight of such a system operating down to 4K is competitive with that of the existing 20K plus systems. The present system contains few or no moving parts and thereby is nearly maintenance free. In contrast to the aforesaid magnetic refrigeration system of Clark which employs thermal valves of superconducting material, i.e., materials which exhibit changes in thermal conductivity in the presence of a magnetic field, thermal flow in the present invention is regulated by materials possessing thermal conductivities which are strongly temperature dependent in the cryogenic temperature range of interest.

SUMMARY OF THE INVENTION

It is therefore an object of the invention to provide a heat transfer system having improved thermal valves.

A second object is to provide an improved heat transfer system that is reliable, low cost with more efficient thermal valving than existing systems.

Another object of the instant invention is the provision of an improved heat transfer system having improved thermal valving and having few or no moving parts thereby being nearly maintenance free.

A further object of the present invention is the provision of an improved heat transfer system that is compact, light in weight, has a low input power requirement and improved thermal valving.

Another object of the invention is the provision of an improved heat transfer system having automatically operating temperature dependent thermal valves.

Briefly, in accordance with one embodiment of the invention, these and other objects are attained in a cryogenic, magnetic refrigeration system or heater including an object to be cooled or heated and a heat reservoir thermally connected by a serial arrangement of a thermal valve having a thermal conductivity decreasing with increasing temperature, a working material of a strongly magnetocaloric nature whose temperature is varied by external means, and another thermal valve whose thermal conductivity increases with increasing temperature. A series of sequentially operated units is also provided.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein:

FIG. 3 represents a schematic of a heater using the improved thermal valving.

FIG. 4 is an embodiment showing a series of sequentially operated heaters.

DESCRIPTION OF THE PREFERRED EMBODIMENT

Figure 1:
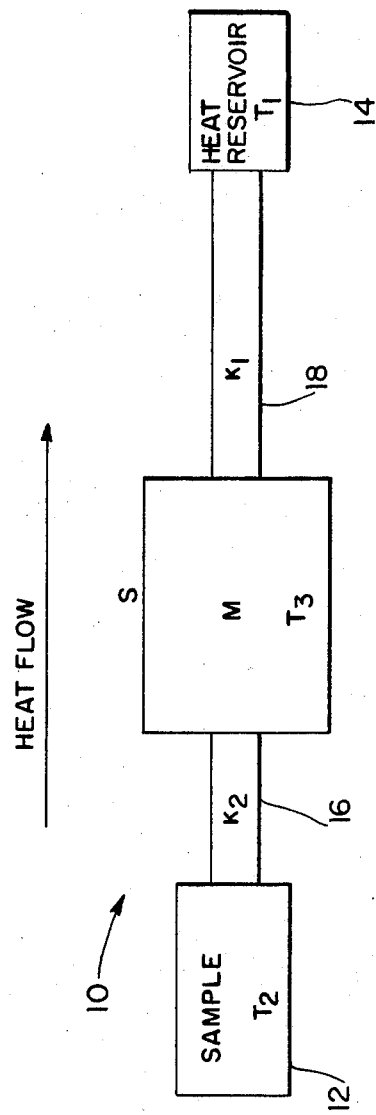
FIG. 1 is a schematic representation of one embodiment of the cryogenic, magnetic refrigeration system with the improved thermal valving.

Referring now to FIG. 1 of the drawings, a schematic of the heat transfer system 10, used as a refrigerator, is shown as being connected to the material, sample or item 12 to be cooled acting as a heat source and to a thermal reservoir 14 which, in this case, is used as a heat sink. The term thermal reservoir is used in the classical sense so that no matter how much heat is transferred to or from it, the temperature of reservoir 14 remains substantially the same. The heat flow, as shown in the sketch, is from left to right from the sample which is at a relatively "colder" temperature $T_2$ to the reservoir at the relatively "hotter" temperature. The system 10 is shown as a thermal coupling represented by the abutting serial arrangement of a thermal valve 16 in physical contact with sample 12, heat transfer element M having a periodic fluctuating temperature $T_3$, and a second thermal valve 18 thermally coupled to heat reservoir 14.

M designates a heat transfer element or working substance which has a periodic temperature variance controlled or affected by some external means S. Preferably, M designates a magnetic material or substance which cools with increasing or decreasing magnetic field. For example, M may designate a ferromagnetic rare earth iron garnet which cools on being magnetized or it may represent a garnet which cools on being demagnetized. The materials and operating characteristics of these garnets having a large magnetocaloric effect in the region of 4K to 25K have been briefly discussed supra, and are detailed more fully in the above forementioned patent to Clark, incorporated by reference. Briefly, however, in the present invention, in contrast to large electromagnets formerly used to cool by adiabatic demagnetization, a small moving permanent magnet (not shown) or other source of periodically variable magnetic field is employed for varying the temperature of the magnetic substance M. The use of a compact source of intense magnetic field such as a superconducting solenoid in the vicinity of 20K would be very useful as an alternative.

M could also be a conventional mechanical refrigeration system or a crystal whose temperature is cycled by a fluctuating electric field. Or M could be an electrical device utilizing the Peltier effect.

Pre-existing refrigerating systems use mechanically or electrically operated valves for allowing heat to flow preferentially and periodically from the sample to be cooled to the heat reservoir which is at higher temperature. In Clark, U.S. Pat. No. 3,841,107, valves 22, 23 function to complete the thermal path between a heat source 12, heat sink 14 and conducting elements 16, 18. In that cryogenic environment valves of a superconducting material were used since such materials exhibit changes in thermal conductivity in the presence of a magnetic field.

In the instant case the two valves 16, 18 are suitable thermally conducting materials. Valves 18 is made chiefly of a material, such as magnesium, which has a thermal conductivity, $K_1$, which increases in its operating range, e.g. 9K-11K, as its temperature increases. This thermal valve conducts heat over a thermodynamic operating cycle from the working substance M to the direction of higher average temperature portions averaged over the cycle. Thermal valve 16 is made of a material whose thermal conductivity $K_2$, preferentially decreases over its operating range, e.g. 9K-11K, as its temperature increases. Sodium chloride is a suitable material for valve 16 which conducts heat over a cycle from the direction of lower average temperature portions, averaged over a cycle, to the working substance. Thus thermodynamically both of these thermal valves can be modeled as temperature dependent one way valves.

In operation, when a magnetic material M, e.g., a garnet, is worked upon by a small moving permanent magnet, or other source of periodically variable magnetic field, the temperatures of both thermal valves, since they are in abutting relationship with the garnet, will experience that same periodic temperature fluctuation. Thus when $T_3$, the temperature of the garnet, cycles as with, for example, an applied magnetic field, both thermal valves will likewise experience that same temperature cycle. Assuming that $T_3$ has instantaneously decreased, the thermal conductivity of valve 16 will increase allowing heat to flow from the sample to the garnet. Valve 18 will experience a decrease in thermal conductivity substantially preventing heat from flowing to the garnet from the heat reservoir 14. Upon an increase in $T_3$, due to heat flow to the garnet from the sample via valve 16, the thermal conductivity of valve 16 will decrease substantially precluding heat flow back to the sample. Valve 18's thermal conductivity will increase since $T_3$ has increased, thus allowing heat to flow from the garnet to the heat reservoir 14. It can be seen from this heat that the thermal valves operate as one way valves. This cycle is repeated as often as necessary to maintain sample 12 at the preselected temperature.

Figure 2:
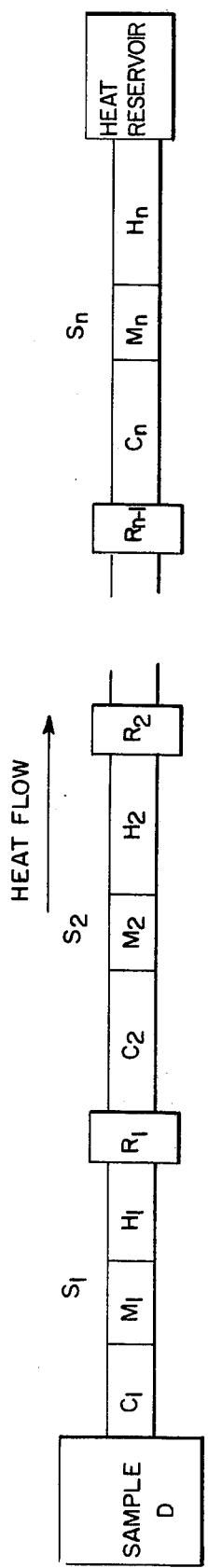
FIG. 2 is a schematic representation of a series of sequentially operated refrigeration units.

FIG. 2 is an example of many possible design configurations in which the single unit of FIG. 1 is repeated "$n$" times. "$M_j (j = 1, \ldots, n)$," denotes the working material whose temperature is varied periodically by external means, which again might be a magnetic field in some devices, or electric fields, or mechanical or electrical reversible sources of work and temperature variation, all denoted by "$S_j (j = 1, \ldots, n)$"; "$H_j (j = 1, \ldots, n)$" denotes the thermally conducting valve material whose thermal conductivity increases as its temperature increases. "$C_j (j = 1, \ldots, n)$" denotes the thermally conducting valve material whose thermal conductivity decreases as its temperature increases. "$R_j (j = 1, \ldots, n-1)$" is a reservoir or reservoirs, some of which may optionally be omitted, made of a material having suitable specific heat capacity. "D" is the material, sample or device to be cooled. A refrigeration system of this type has the advantage of being comprised of few or no moving parts. Its mode of operation is merely duplicative of the single unit described and illustrated as FIG. 1.

Furthermore, heat flow could obviously be altered by the reversal of the position of the thermal valves such that instead of being used as a cooling device, the heat transfer device 10 could be used as a heater to heat a sample, object or environment. In this case, reservoir 14 is used as a heat source. FIG. 3 shows this interrelationship in which thermal valve 16 replaces thermal valve 18 and vice versa. The operation of the device is comparable to the refrigeration system depicted in FIG. 1 except that the heat flow is to the sample or object to be heated.

The heat source is in an abutting serial relationship with a thermal valve 16, working substance M, second thermal valve 18 and the sample. The thermal conductivity, $K_2$, of valve 16 decreases with an increase in temperatures with the thermal conductivity $K_1$, of valve 18 increasing with an increase in temperature, as before. The materials are likewise the same as before. As the instantaneous temperature $T_3$ of M decreases due to the effect of some external means S, $K_2$ will increase allowing heat to flow from heat source to M through valve 16. The thermal conductivity of valve 18 has coincidently decreased with the instantaneous decrease in $T_3$ thereby substantially precluding any heat flow from the sample to M. When $T_3$ increases, $K_2$ will decrease and $K_1$ will increase thus substantially eliminating heat flow from M to the heat source and facilitating heat flow from M to the sample to be heated. This heating cycle is repeated in order to raise and maintain the temperature of the object to be heated.

FIG. 4 operates as a sequentially operated heater in which heat is taken from a heat reservoir and ultimately transferred to a sample or object to be heated. FIG. 4 is analogous to FIG. 2 in that the single unit of FIG. 3 is repeated "n" times. "$M_j (j = 1, \ldots, n)$," denotes a working substance whose temperature is cyclically varied by external means "$S_j (j = 1, \ldots n)$". "$H_j (j = 1, \ldots, n)$" is the thermal valve whose thermal conductivity increases with an increase in temperature; "$C_j (j = 1, \ldots, n)$" is the other thermal valve whose thermal conductivity decreases with an increase in temperature. "$R_j (j = 1, \ldots, n-1)$" is a reservoir or reservoirs which act as the heat source for the next heater unit in the series. Optionally some of the reservoirs may be omitted.

The mode of operation of the ganged units of FIG. 4 is again a repeat to the nth degree of the single unit heater and thus a discussion thereof would seem to be superfluous.

The principle advantage of these methods of cooling and heating are small size, reliability, efficiency, low cost and capability of being designed for operation over unusual or difficult ranges of temperatures. The present invention is more efficient than the one demonstrated by Clark inasmuch as the instant system uses fewer working substances and the valving is more automatic since the valves are inherently temperature dependent rather than dependent on the appliation of an external field. A region of high efficiency is below 20K where mechanical refrigeration is difficult and expensive.

Obviously, numerous modifications and variations of the present invention are possible in the light of the above teachings. It is therefore to be understood that within the scope of the appended claims the invention may be practiced otherwise than as specifically described herein.

What is claimed as new and desired to be secured by Letters Patent of the United States is:

1. A heat transfer system adapted to be coupled in heat transfer relationship between a heat reservoir and an object to be cooled or heated, said heat transfer system comprising the serial arrangement of:
   a first thermal valve having a thermal conductivity which increases with decreasing temperature;
   a working substance, the temperature of which may be varied by an external means;
   a second thermal valve having a thermal conductivity which increases with increasing temperature; and,
   an external means to vary the temperature of said working substance.

2. The heat transfer system of claim 1 wherein said working substance is a magnetocaloric material and said external means is a source of periodically varying magnetic field.

3. The heat transfer system of claim 2 wherein said magnetocaloric material is a rare earth iron garnet.

4. The heat transfer system of claim 3 wherein said external means is a small moving permanent magnet.

5. The heat transfer system of claim 4 wherein the material of said first valve is sodium chloride and the material of said second valve is magnesium.

6. The heat transfer system adapted to be coupled in heat transfer relationship between a heat reservoir and an object to be cooled or heated, said heat transfer system, comprising a plurality of heat transfer units each comprising the serial arrangement of:
   a supplementary heat reservoir;
   a first thermal valve having a thermal conductivity which increases with decreasing temperature;
   a working substance, the temperature of which may be varied by an external means;
   a second thermal valve having a thermal conductivity which increases with increasing temperature; and,
   an external means to vary the temperature of said working substance.

7. The heat transfer system of claim 6 wherein said working substance is a magnetocaloric material and said external means is a source of periodically varying magnetic field.

8. The heat transfer system of claim 7 wherein said magnetocaloric material is a rare earth iron garnet.

9. The heat transfer system of claim 8 wherein said external means is a small moving permanent magnet.

10. The heat transfer system of claim 9 wherein the material of said first valve is sodium chloride and the material of said second valve is magnesium.

* * * * *